May 21, 1935. J. M. CHRISTMAN 2,002,310
TRANSMISSION MECHANISM
Filed Nov. 30, 1931
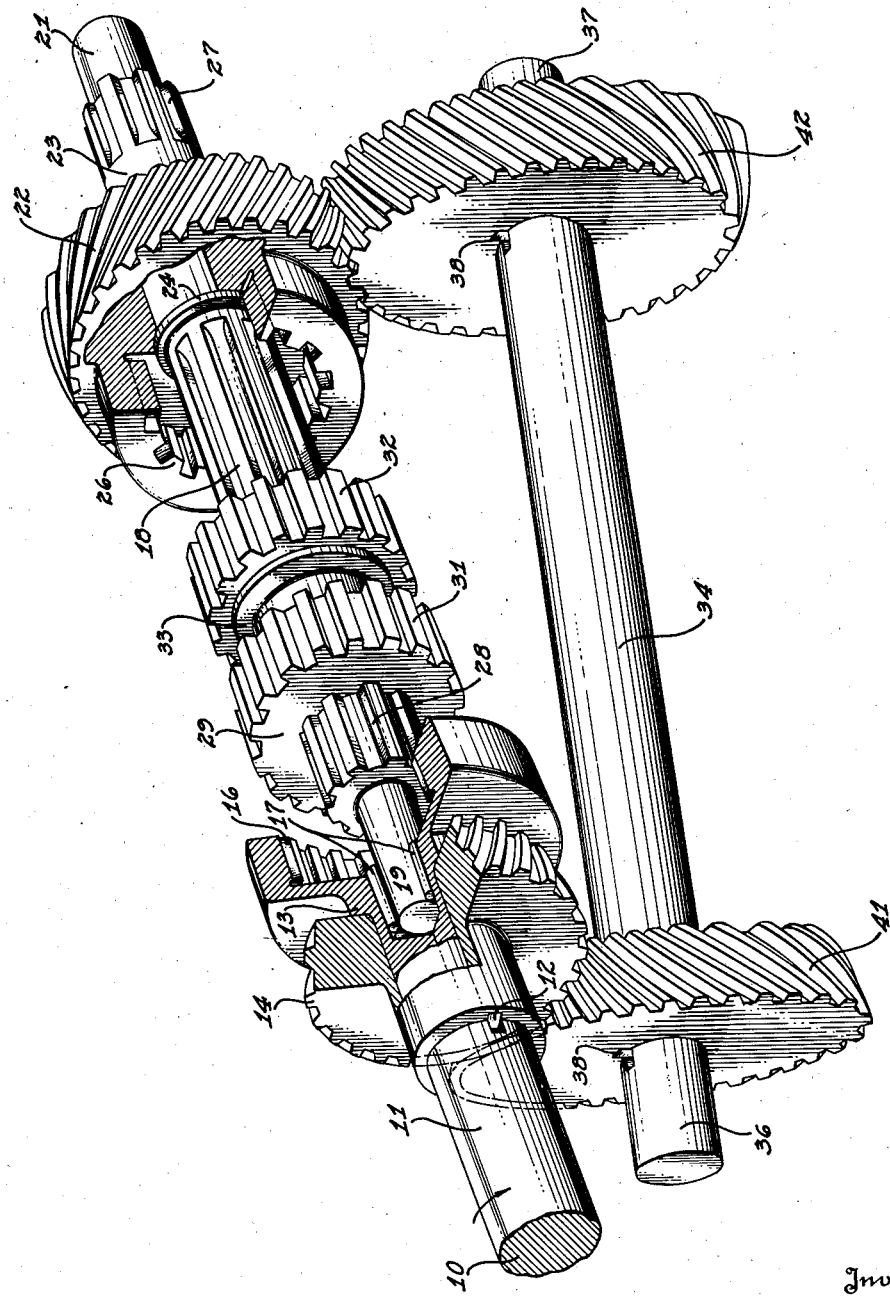
Inventor
JOHN M. CHRISTMAN.
By
Attorney Patented May 21, 1935

2,002,310

UNITED STATES PATENT OFFICE 2,002,310

TRANSMISSION MECHANISM

John M. Christman, Detroit, Mich., assignor to Packard Motor Car Company, Detroit, Mich., a corporation of Michigan Application November 30, 1931, Serial No. 577,913

8 Claims. (Cl. 74—370)

This invention relates to transmission mechanisms and more particularly to the transmission mechanisms for motor vehicles.

In motor vehicle transmissions a speed changing drive is customarily provided between aligned driving and driven shafts. Such speed or torque changing drive is usually obtained by means of mechanism which may include a parallel intermediate or counter shaft, and pairs of gears connecting both the driving and the driven shafts to the intermediate shaft. Oftentimes these gears are constantly engaged and in the geared drive power is transmitted from the driving shaft gear to the counter shaft driven gear, along the countershaft to the counter shaft driving gear, and from there to the driven shaft gear which is usually rotatably mounted on the driven shaft. The connection between the driven shaft gear and the driven shaft is generally obtained by means of a shiftable positive clutch element which is also adapted to connect directly to the driving and driven shafts.

Thus it will be evident that at least four gears are usually involved in accomplishing the geared type of drive. In motor vehicles, a quiet geared drive is an essential element which is of steadily increasing importance, and it is one of the objects of this invention to reduce the noise generated by motor vehicle transmission gears.

The desirability of a quiet change speed gearing for motor vehicle transmissions has long been recognized and numerous attempts to construct such a mechanism have been made with varying degrees of success. These attempts, however, have all centered about the development of new types of gear teeth and no attempt has been made to utilize any of the known gears except those operable for connecting parallel shafts. Examples of gears which have been developed in an effort to silence the transmission mechanism appear in numerous patents among which are patents numbered 1,788,701; 1,803,295 and 1,861,258 all granted to John Bethune.

Instead of approaching the solution of the problem in the usual way by the use of new gears or gear teeth, my invention solves the problem in a new and more expeditious manner by providing a new arrangement for a motor vehicle transmission by which arrangement I am enabled to use gears already known and yet to obtain a most remarkable degree of quietness combined with excellent wearing characteristics.

While it is not my intention to attempt an explanation of the theoretical factors that contribute to the success of my new mechanism, there appear to be at least two important reasons why the device is unusually quiet. First, my novel arrangement of the transmission enables me to use a type of gears which are known to be less noisy than those heretofore used, but which it has been up to now impossible to use in such a mechanism. Secondly, the use of two pairs of these gears disposed as they are in my new arrangement, appears to permit each pair of the gears to dampen rather than accentuate the vibration from the other pair of gears.

According to my invention axially aligned drive and driven shafts are utilized as heretofore but the counter shaft instead of being parallel as in the ordinary type of transmission, is not parallel nor even co-planar with the drive and driven shafts, but is set askew to their axis. Ordinarily this would be expected to cause tremendous difficulty in the gearing of the drive and driven shafts to the counter shaft. However, I have found that not only may this difficulty be overcome but numerous important advantages may be obtained by the use of one pair of hypoid gears to connect the drive shaft and the counter shaft and a second pair of similar gears to connect the counter shaft and the driven shaft.

As I have already stated the hypoid gears are not only quiet in themselves but the combined action of the two pairs of gears eliminate still further noise from the mechanism. A possible explanation of the unusual quietness may lie in the fact that the points of contact between the gears of the two pairs are angularly disposed to each other about the counter shaft or about the drive-driven shaft, whichever is taken as a reference axis. This angular difference may be responsible for some difference in the phase of the vibrations of the two sets of gears, thus causing a dampening effect. This suggestion of a reason for the action of my new mechanism is, however, merely a suggestion and I do not wish to be limited by it.

Other objects and details of the invention will appear from the following description taken in connection with the drawing which forms a part of this specification and which shows a perspective view of a portion of a motor vehicle transmission mechanism.

Referring by numerals to the drawing, 10 is a driving shaft, which may be a clutch shaft, driven from the vehicle engine by a clutch mechanism (not shown). The preferred direction of rotation of the shaft is shown by the arrow thereon. This shaft is formed with a bearing portion 11 and is adapted to be supported on suitable bearings in the transmission casing, not shown. Keyed to the shaft, as at 12, and abutting a shoulder 13 thereon, is a driving gear 14. Integrally formed on the driving shaft is a positive internal clutch gear 16 and formed within the end of the shaft is a recess within which is located a thrust bearing 17 abutting against the tapered wall of the recess.

18 is a driven shaft, which may be the main transmission shaft and is aligned co-axially with the driving shaft. Formed thereon are bearing surfaces 19 and 21 of which the former, tapered as shown, is adapted to be supported by the thrust bearing 17 and the latter by the transmission casing. A driven shaft driving gear 22 is rotatably supported on the smooth portion 23 of the driven shaft. The teeth of this gear are formed and are driven in such a way as to cause an axial thrust on the gear which is resisted by a supporting shoulder 24 formed on the shaft. Movement of the gear 22 in the opposite direction may be resisted in any suitable manner, though, as stated, the shape of this gear is such as to obviate the possibility of any such thrust. Integrally formed on the gear 22 is an internal positive clutch gear 26 facing towards the positive clutch element on the driving shaft.

The driven shaft 18, between the smooth portion 23 and the bearing 21, is splined, as at 27, for the reception of any further gears which may be necessary to accomplish additional geared drives to the propeller shaft. If such a drive is necessary, there will, of course, be additional gearing mechanism and counter shafts, not shown in the drawing.

The driven shaft 18, between the shoulder 24 and the bearing end portion 19, is splined as shown at 28, and slidably supported on these splines is a shiftable positive clutch element 29 formed with external teeth 31 similar to the teeth 16 on the driving shaft clutch element, and with external teeth 32 similar to the driven shaft clutch teeth 26. These clutch teeth 31 and 32, which may be similar, are separated by a groove 33 engageable by a shifter fork, not shown, which, as is well known, is under the control of the vehicle operator. Thus the positive clutch element 29 may be moved to form a direct driving engagement between the driving shaft 10 and the driven shaft 18, or it may be moved to form a driving engagement between the driven shaft driving gear 22 and the driven shaft. When in this latter position, the positive clutch element forms, with the assistance of additional mechanism about to be described, a geared drive between the driving and driven shafts. In this latter position the connection between the driving shaft and the driven shaft includes a counter shaft 34, the axis of which is shown at an angle to the axis of the driving and driven shafts. Since the axes are not co-planar they will not intersect.

As shown, the counter shaft is formed with suitable reduced end bearing portions 36 and 37 adapted to be supported by the transmission case in any well known manner, not shown. Counter shaft gears 41 and 42 are keyed, as indicated at 38, to these bearing portions. Their teeth are so formed as to tend to move the gears apart. This movement may be prevented by suitable thrust bearings not shown. Gear 41 may be called the counter shaft constant mesh gear and gear 42 may be called the second speed counter shaft constant mesh gear. As these names indicate, these counter shaft gears are in constant mesh with the driving shaft gear 14 and the driven shaft gear 22 respectively, and, as previously mentioned, when the positive clutch element 29 is shifted to the right, a geared drive is thus provided between the driving and driven shafts through the counter shaft.

In a motor vehicle transmission, the gear 41 will normally be larger than gear 14 and gear 42, and gear 22 will generally be smaller than gear 42. Thus, with the axis of the counter shaft non-parallel to the axis of the driving and driven shafts, the relationship between the gears will cause the axis of the counter shaft to lie in such a position with respect to the driving and driven axis that no plane can be formed to include both the counter shaft axis and the driving and driven shaft axis.

It will be evident that the four gears 14, 41, 42 and 22, will, by virtue of the position of their axes, have a pitch circle engagement of both a rolling and a sliding action. I have thus accomplished one of the objects of the invention.

Pure sliding pitch circle engagement, as in a worm gear, is quiet but subject to high wear characteristics as compared with the pure rolling circle engagement encountered with gears having pitch circle surfaces which are portions of parallel cones or cylinders. The gears of the present transmission are shown as being hypoid gears, that is, gears whose pitch surfaces are portions of hyperboloids and I have arranged the angles of the gear teeth in such a way as to provide a geared drive between the shafts 10 and 18 in which all thrust due to rotation of the driving shaft in the direction shown by the arrow is absorbed in the mechanism itself. Thus the countershaft, as a result of the thrust of the counter shaft gears, is under tension and the driving and driven shafts are thrust towards each other, the thrust here being taken by the bearing 17 interposed between the tapered portions of the driving and driven shafts. In this connection it is thus unnecessary to provide a thrust bearing to support the counter shaft or the driving and driven shafts.

As is well known, the hyperboloidal surfaces formed by the pitch circles of the four gears above mentioned, are members of the class of surfaces which are generated by the rotation of a line about an axis which it does not intersect. A hyperboloidal surface may also be generated by the rotation of a hyperbola about an axis perpendicular to the mid-point of the line joining its foci, or in other words, by the rotation of a curved line about an axis.

Gear surfaces of the above character, when interengaging, have a sliding and rolling action between the lines of contact, and, by using gears with pitch surfaces of this character in my new mechanism I am able to obtain not only the quietness which results from the coaction of the two pairs of gears as I have arranged them, but also an even greater degree of noiselessness because of the relatively quiet operation of the hypoid gears themselves. Furthermore, in obtaining this quietness the wearing qualities of the gears are not sacrificed. In a motor vehicle having aligned driving and driven shafts, the advantages of my new type of gear drive are evidenced by the greatly reduced gear noise, and thus increased acceleration may be obtained by shifting to a geared drive without attendant objectionable gear noise. Thus the practical usefulness of the intermediate gears is greatly increased.

While I have shown and described a preferred embodiment of this invention, I wish it to be understood that I do not confine myself to the precise details of the construction herein set forth by way of illustration. It is apparent that many changes or variations may be made by those skilled in the art without departing from the spirit of the invention or exceeding the scope of the appended claims.

Having thus described my invention, what I claim and desire to secure by Letters Patent is:

1. A gearing for a motor vehicle transmission in which the drive shaft and driven shaft are aligned, that comprises a counter shaft askew to the axis of the drive and driven shafts, a pair of gears connecting the drive shaft with the counter shaft and a second pair of gears connecting the counter shaft with the driven shaft.

2. In a motor vehicle transmission having aligned drive and driven shafts, a gearing that comprises a rotatable shaft non co-planar with the axis of the drive and driven shafts, a pair of hypoid gears connecting the drive shaft with the rotatable shaft and a second pair of hypoid gears connecting the rotatable shaft and the driven shaft.

3. A gearing comprising a drive shaft, a counter shaft located askew to said drive shaft, a pair of hypoid gears connecting the said shafts, a driven shaft axially aligned with the drive shaft, and a pair of hypoid gears connecting the counter shaft with the driven shaft, said hypoid gears having their teeth oppositely arranged so that the thrust resulting from one pair of the gears will be offset by the thrust resulting from the other pair of the gears.

4. A motor vehicle transmission comprising aligned drive and driven shafts, a counter shaft arranged to be non co-planar with said shafts, a pair of gears connecting said drive and counter shafts, a second pair of meshing gears one of which is affixed to the counter shaft and the other of which is freely rotatable upon the driven shaft and a clutch member operable to selectively couple either the drive shaft or the freely rotatable gear to the driven shaft.

5. In a transmission, three shafts, two of which are angularly disposed to and offset from one another and the third of which is aligned with one of the first two shafts, a pair of hypoid gears connecting two of the shafts, a second pair of hypoid gears, one member of which is journaled on the third shaft and the other of which is secured to one of the first two shafts, and clutch means for selectively coupling one member of each pair of hypoids to the third shaft.

6. In a transmission, a drive shaft and a driven shaft which are aligned with one another and lie in a horizontal plane, a countershaft having its axis in a parallel horizontal plane but angularly disposed to the axis of the first two shafts, a pair of hypoid gears, one member of which is secured to the drive shaft and the other member of which is secured to the countershaft, a second pair of hypoid gears, one member of which is mounted on the driven shaft and the other member of which is secured to the countershaft, and clutch means for selectively coupling the first-mentioned members of the two pairs of gears to the driven shaft.

7. A motor vehicle transmission comprising a counter shaft, at least two gears carried by said counter shaft, a second shaft askew to the counter shaft, a gear carried by the second shaft and meshing with one of the gears on the counter shaft, a third shaft and a gear carried thereby and meshing with another of the gears on the counter shaft.

8. A motor vehicle transmission comprising aligned drive and driven shafts, a counter shaft askew to said shafts and pairs of gears connecting the drive and driven shafts to the counter shaft, said pairs of gears having their teeth oppositely inclined in such a manner as to neutralize the end thrust on the counter shaft and urge the ends of the drive and driven shafts together when the transmission is driven in the normal direction.

JOHN M. CHRISTMAN.